United States Patent [19]
Kosmanski

[11] 3,874,059
[45] Apr. 1, 1975

[54] ROTARY ENGINE APEX SEAL AND SPRING INJECTOR

[75] Inventor: Thomas J. Kosmanski, Troy, Mich.

[73] Assignee: General Motors Corporation, Detroit, Mich.

[22] Filed: Apr. 17, 1974

[21] Appl. No.: 461,754

[52] U.S. Cl. .................................. 29/235, 29/270
[51] Int. Cl. .......................................... B25b 27/14
[58] Field of Search ............ 29/235, 269, 270, 271, 29/283; 269/3, 287

[56] References Cited
UNITED STATES PATENTS

| | | | |
|---|---|---|---|
| 550,560 | 11/1895 | Myers | 29/235 |
| 2,252,816 | 8/1941 | Santrey | 29/270 |
| 3,367,016 | 2/1968 | Sainz | 29/270 |

FOREIGN PATENTS OR APPLICATIONS

| | | | |
|---|---|---|---|
| 702,062 | 3/1931 | France | 29/269 |

*Primary Examiner*—Al Lawrence Smith
*Assistant Examiner*—Harold P. Smith, Jr.
*Attorney, Agent, or Firm*—Charles R. Engle

[57] ABSTRACT

A rotary engine rotor apex seal injector apparatus including two body members fitting together to define a seal receiving chamber permitting handling of a multi-component apex seal assembly. The body members include guide means which conform to a corner seal recess aligning the seal with a rotor groove whereby a push rod can be inserted into the body members injecting the seal assembly into the rotor groove.

3 Claims, 4 Drawing Figures

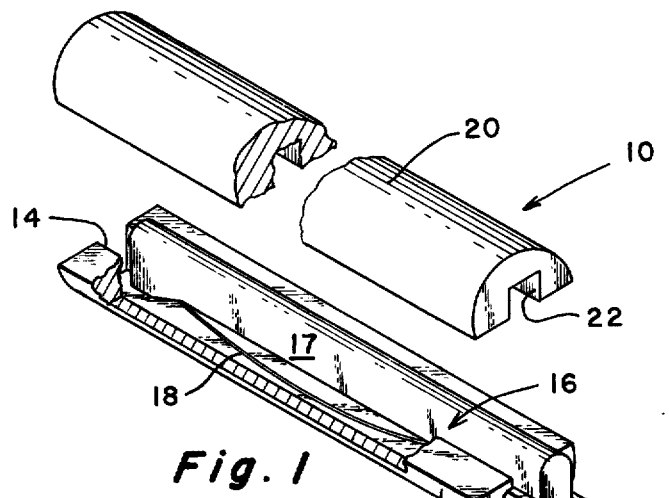
Fig. 1
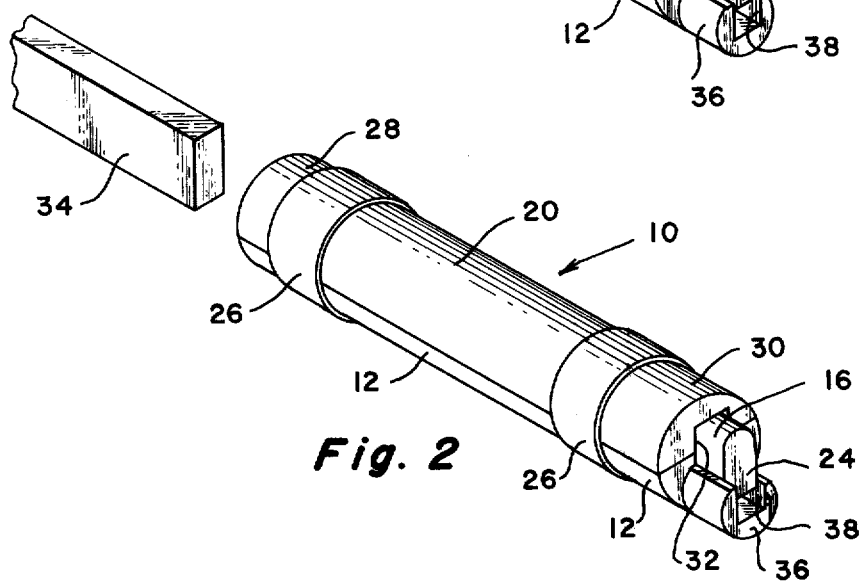
Fig. 2
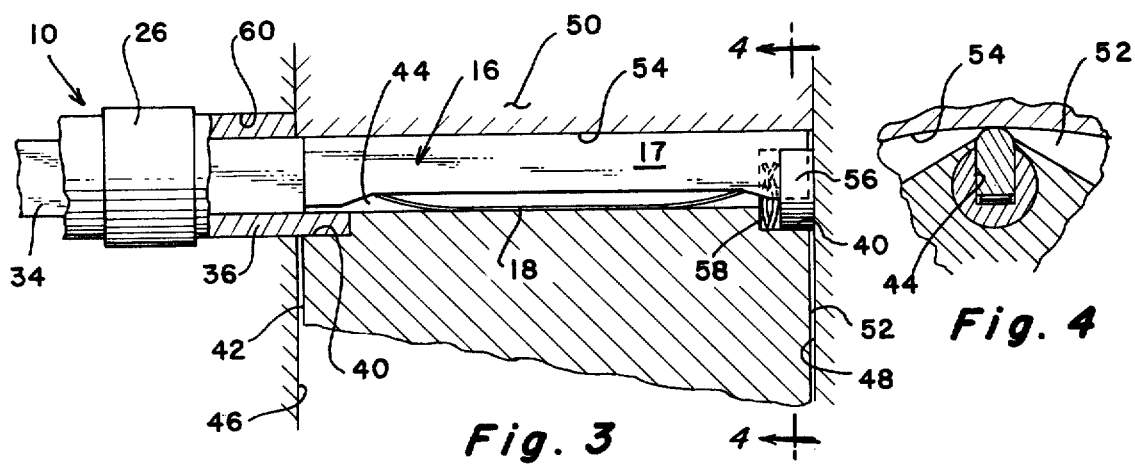
Fig. 3
Fig. 4

3,874,059

ROTARY ENGINE APEX SEAL AND SPRING INJECTOR

This invention relates to a rotary engine rotor apex seal injector apparatus and more specifically to such an apparatus permitting assembly of a multi-component apex seal into a rotor groove in a single assembly operation.

Assembly of multi-component rotary engine rotor apex seals has presented a problem in the past because of the difficulty encountered in attempting to handle and retain the several components assembled for insertion into a rotor apex seal groove. Various forms of rotary engine rotor seals include not only the main seal in conjunction with a biasing spring, but frequently include angled end portions making it difficult to retain the components in a desired position while they are placed in a rotor apex groove. The present invention avoids these difficulties by providing an injector apparatus permitting the several components of the apex seal to be initially placed in one body member which is closed by a second body member and the injector apparatus is then retained assembled by an external telescopically positioned sleeve member. Guide means are provided on the body members so that the injector unit is specifically positioned relative to the rotor groove and then it is only necessary to insert a push rod in the opposite end of the injector apparatus for sliding the assembled seal into the rotor groove while the rotor remains assembled in the engine housing. This assembly operation can be performed either during build-up of the rotary engine or it can be accomplished through an access hole in either the front or rear engine end housings without complete disassembly of the engine.

Accordingly, a prime object of my invention is the provision of an injector apparatus permitting assembly of a multi-component apex seal within a rotary engine rotor apex seal groove with a minimum of difficulty.

Another object of my invention is the provision of an apex seal injector apparatus permitting assembly of the seal into a rotor apex groove by merely sliding the assembled seal out of the injector into the rotor groove.

A further object of my invention is the provision of a rotary engine rotor apex seal injector apparatus including a first body member containing a slot receiving the lower portions of components of the apex seal assembly, a second body member containing a slot receiving the upper portions of said seal and being piloted onto the first body member by the assembled seal, a sleeve member being telescopically positioned over the engaged body members retaining the injector assembled so that the slots cooperate defining a chamber with the seal therein, guide means provided on one end of the injector assembly for precisely positioning the injector apparatus in alignment with the rotor seal groove and the injector assembly permitting injecting of the seal assembly into the rotor groove by inserting a push rod into the chamber and sliding the seal into the rotor groove.

The novel features which I believe to be characteristic of my invention are set forth with particularity in the appended claims. My invention itself, both as to its organization and method of operation, may be best understood by reference to the following description taken in connection with the accompanying drawings in which:

FIG. 1 is a partially exploded perspective view, partly in section, illustrating a multi-component apex seal assembly positioned in one body member of the injector apparatus of my invention.

FIG. 2 is an assembled perspective view illustrating a seal assembly positioned within the injector apparatus of my invention in alignment with a push rod which is utilized to extend the seal assembly into a rotor groove.

FIG. 3 is a fragmentary cross sectional view illustrating the injector apparatus of my invention being positioned with its guide means in a corner seal recess with the seal assembly being moved into a rotor apex groove.

FIG. 4 is a fragmentary sectional view taken on line 4—4 of FIG. 3.

With reference now to FIG. 1, a seal injector apparatus 10 constructed in accordance with my invention includes a first body member 12 containing an axially extending slot 14 having a dimension for snugly receiving an apex seal assembly 16 including a main seal member 17 and a biasing spring 18. The injector apparatus 10 further includes a second body member 20 likewise containing an axially extending slot 22 which receives the upper portions of seal member 17.

In an assembled relationship, as illustrated in FIG. 2, the first body member 12 receives and supports the lower portions 24 of seal assembly 16 and the second upper body member 20 is positioned thereupon and piloted into precise alignment with the first lower body member 12 by the upper portions of seal member 17. A pair of sleeve members 26 are slipped over the ends 28 and 30 of the assembled body members 12 and 20 thereby retaining them in assembled relationship. Of course, the sleeve members 26 are of a dimension for snugly fitting upon the body members 12 and 20 retaining them in precise alignment with the seal assembly 16 slidably positioned in an axially extending chamber 32 formed by the cooperating slots 14 and 22. A push rod 34 is configured to conform to the shape of chamber 32 for slidably moving the assembled apex seal 16 out of injector assembly 10 as will be later described in detail.

Referring now to FIG. 3, an integral guide member 36 in the form of a cylindrical extension is provided on one end of the first body member 12 and likewise contains a slot 38 having the same dimension as slot 14 in the body member. The guide member 36 has an external configuration conforming to a corner seal recess 40 provided in a rotor side face 42 adjacent a rotor seal groove 44. The engine housing includes spaced end walls 46 and 48 which in combination with a central housing member 50 define a rotor cavity 52, the cavity having a trochoidal inner peripheral surface 54 which is formed on central housing member 50. The corner seal recess 40 normally contains a button type seal 56 which is biased outwardly into engagement with end wall 48 via a wire spring 58 as is illustrated at one end of the seal assembly 16.

In operation, the apex seal assembly 16, which can include a unitary or multi-component main seal member 17 in combination with one or more biasing springs 18, is manually assembled in body member 14. The second upper body member 20 is then placed upon the seal assembly 16 and is piloted into precise engagment with the first body member 12 by the upper portions of the seal assembly. The upper body member 20 is manually pressed against body member 12 compressing spring 18. The body members 12 and 20 are held together while the sleeves 26 are telescopically positioned upon the outer surface of the body members retaining them in an assembled position with the apex seal assembly 16 slidably retained within chamber 32. The cylindrical guide member 36 is then placed in a corner seal recess 40, either during engine build-up prior to installation of end wall 46, for assembly into rotor groove 44. The seal assembly can be inserted through an access aperture 60 in the end wall 46 provided for this purpose. The aperture 60, of course, would be enclosed by a closure member, not shown. While the injector assembly 10 is positioned with its guide member 36 in engagement with corner seal recess 40, the push rod 34 is inserted at end 28 of the assembly and is moved therein to extend and inject the apex seal assembly 16 into rotor groove 44 guickly assembling the multi-component apex seal in place without disturbing the assembled arrangement of the specific components of the apex seal. Since the spring 18 is in a prestressed condition, it continually urges seal 17 into engagement with the trochoidal surface 54 of housing member 50.

It is apparent from the above description that my invention provides a simple and economical means of retaining a multi-component apex seal assembly in place so that it may be easily and positively assembled within a seal groove at each apex of a triangularly shaped rotor of a rotary engine. Further, by providing access apertures 60 in one end wall 46 of the rotary engine housing, the seals can be readily changed without substantial disassembly of the rotary engine.

While I have shown and described a particular embodiment of my invention it will, of course, be understood that various modifications and alternative constructions thereof may be made without departing from the true spirit and scope of my invention and that I intend by the appended claims to cover all such modifications and alternative constructions as fall within the true spirit and scope of my invention.

I claim:

1. A rotary engine rotor apex seal injector apparatus for assembling multi-component apex seals in axial grooves formed at each apex of a triangularly shaped rotor planetating within a trochoidal engine cavity, the cavity being defined by spaced parallel housing end walls and a central inner peripheral wall defining the trochoid, the rotor including opposite side walls parallel to said end walls and containing arcuate gas seals each extending along a respective peripheral surface of said triangularly shaped rotor and engaging said end walls, said rotor side walls also including corner seal recesses at each juncture of said gas seals adjacent each end of said apex seal grooves; said apex seal injector comprising in combination: a first body member containing an axially extending slot; a second body member also containing an axially extending slot aligning with the slot in said first body member when placed thereon in an assembled mating relationship; said slots defining an axially extending chamber extending through the assembled first and second body members and having dimensions sufficient for closely receiving and slidably containing the components of said apex seal assembly; means for rigidly retaining said body members in assembled engagement, said means comprising a sleeve member telescopically fitting over said body members in a close fit relationship; and guide means extending from one end of said body members conforming to one of said corner seal recesses aligning the chamber in said body members and consequently said apex seal assembly with the seal groove in said rotor apex whereby said seal assembly is injected into said rotor groove by applying a force to one end of said seal assembly in said injector and extending the seal assembly outwardly into said rotor apex groove.

2. A rotary engine rotor apex seal injector apparatus for assembling multi-component apex seals in axial grooves formed at each apex of a triangularly shaped rotor planetating within a trochoidal engine cavity, the cavity being defined by spaced parallel housing end walls and a central inner peripheral wall defining the trochoid, the rotor including opposite side walls parallel to said end walls and containing arcuate gas seals each extending along a respective peripheral surface of said triangularly shaped rotor and engaging said end walls, said rotor side walls also including corner seal recesses at each juncture of said gas seals adjacent each end of said apex seal grooves; said apex seal injector comprising in combination: a first body member containing an upwardly facing axially extending slot; said multi-component apex seal assembly being mounted in the upwardly facing slot of said first body member; a second body member containing a downwardly facing axially extending slot being piloted onto said first body member by said seal assembly engaging the downwardly facing slot thereby aligning said second body member relative to said first body member when placed thereon; said slots defining an axially extending chamber extending through the assembled first and second body members and having dimensions for closely receiving and containing the components of said apex seal assembly while permitting sliding movement therein; means for rigidly retaining said body members in assembled engagement, said means comprising a sleeve member telescopically fitting over said body members in a close fit relationship; and guide means integral with said first body member and extending axially thereof conforming to one of said corner seal recesses aligning the chamber in said body members with said rotor apex seal groove whereby application of a force on one end of the seal assembly injects the same into said rotor groove.

3. A rotary engine rotor apex seal injector apparatus for assembling multi-component apex seal assemblies including at least one biasing spring in axial grooves formed at each apex of a triangularly shaped rotor planetating within a trochoidal engine cavity, the cavity being defined by spaced parallel housing end walls and a central inner peripheral wall defining the trochoid, the rotor including opposite side walls parallel to said end walls and containing arcuate gas seals each extending along a respective peripheral surface of said triangularly shaped rotor and engaging said end walls, said rotor side walls also including corner seal recesses at each juncture of said gas seals adjacent each end of said apex seal grooves; said apex seal injector apparatus comprising in combination: a first body member containing an upwardly facing axially extending slot; said multi-component seal assembly being mounted in said slot; a second body member containing a downwardly facing axially extending slot receiving the upper portions of said seal assembly and being piloted upon said first body member in alignment therewith as said seal engages the downwardly facing slot; closure movement of said body members into engagement compressing said seal spring; said slots cooperatively defining an axially extending chamber extending through the assembled first and second body members and having dimensions for closely receiving and containing the components of said apex seal assembly while permitting sliding movement of said seal therein means for rigidly retaining said body members in assembled engagement, said means comprising; a pair of sleeve members telescopically fitting over said body members in a close fit relationship adjacent respective ends thereof; and an arcuate shaped guide member integral with said first body member and containing a slot aligned with the slot in said body member having an outer surface conforming to one of said corner seal recesses aligning the chamber in said body members containing said seal assembly with said rotor apex seal groove whereby insertion of a push rod into said chamber at an end opposite to said guide means is operative to force said seal assembly out of said injector apparatus into said rotor apex groove whereby said spring continuously urges said seal into engagement with the inner peripheral wall of said housing.

* * * * *